United States Patent
Ueda (10) Patent No.: US 12,143,034 B2
(45) Date of Patent: Nov. 12, 2024

(54) POWER CONVERSION DEVICE, CONTROL DEVICE, DATA ACCUMULATING DEVICE, AND DATA ACCUMULATING METHOD

(71) Applicant: KABUSHIKI KAISHA YASKAWA DENKI, Fukuoka (JP)

(72) Inventor: Takeshi Ueda, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 237 days.

(21) Appl. No.: 17/664,407

(22) Filed: May 21, 2022

(65) Prior Publication Data

US 2022/0278630 A1   Sep. 1, 2022

Related U.S. Application Data

(63) Continuation of application No. PCT/JP2020/042679, filed on Nov. 16, 2020.

(30) Foreign Application Priority Data

May 12, 2020   (JP) .................................. 2020-083799

(51) Int. Cl.
*G06F 1/28*   (2006.01)
*H02M 7/539*   (2006.01)
(Continued)

(52) U.S. Cl.
CPC .............. *H02M 7/539* (2013.01); *G06F 1/28* (2013.01); *H02P 27/06* (2013.01); *H02M 1/0009* (2021.05)

(58) Field of Classification Search
CPC ....... H02M 7/539; H02M 1/0009; G06F 1/28; H02P 27/06

See application file for complete search history.

(56) References Cited

U.S. PATENT DOCUMENTS 5,586,328 A * 12/1996 Caron ........................ G06F 8/48
                                                       717/145
5,758,123 A *  5/1998 Sano ........................ G06F 30/33
                                                        703/22
(Continued)

FOREIGN PATENT DOCUMENTS

JP    2017-033346 A    2/2017
JP    2018124818 A     8/2018
(Continued)

OTHER PUBLICATIONS

EESR issued on Nov. 17, 2023_EPApplication No. 20892885.3.
(Continued)

*Primary Examiner* — Zahid Choudhury
(74) *Attorney, Agent, or Firm* — Osha Bergman Watanabe & Burton LLP (57) ABSTRACT

A power conversion device is provided, which includes: a power conversion circuit that performs power conversion between a primary power and a secondary power; a buffer data accumulation circuit that, in a predetermined buffer cycle, repeatedly acquires data sets relating to a state of the power conversion circuit and store the data sets in a ring buffer; a state monitoring circuit that generates a trigger signal in a case where a state of a predetermined monitoring target satisfies a predetermined condition; and a data replication circuit that, in a case where a trigger signal is generated, stores, in a data storage circuit, a plurality of the data sets accumulated in the ring buffer in a target storage period including a time before a generation time of the trigger signal.

17 Claims, 7 Drawing Sheets

(51) Int. Cl.
*H02P 27/06* (2006.01)
*H02M 1/00* (2006.01)

(56) References Cited

U.S. PATENT DOCUMENTS

| | | | |
|---|---|---|---|
| 10,783,029 B2* | 9/2020 | Huh | G06F 11/1446 |
| 2008/0205092 A1* | 8/2008 | Sokuza | H02P 27/06 363/34 |
| 2012/0024571 A1 | 9/2012 | Mohring et al. | |
| 2012/0245712 A1 | 9/2012 | Mohring et al. | |
| 2018/0032047 A1* | 2/2018 | Nishizono | H02P 29/10 |
| 2018/0021504 A1 | 8/2018 | Nakayama et al. | |
| 2018/0215042 A1 | 8/2018 | Nakayama et al. | |
| 2019/0017227 A1 | 6/2019 | Duan et al. | |
| 2019/0018766 A1 | 6/2019 | Sugiyama et al. | |
| 2019/0172274 A1* | 6/2019 | Duan | F16H 59/00 |
| 2019/0187666 A1 | 6/2019 | Sugiyama et al. | |
| 2020/0016920 A1 | 5/2020 | Kinomura | |
| 2020/0169205 A1 | 5/2020 | Kinomura | |
| 2020/0210336 A1 | 7/2020 | Bräutigam et al. | |

FOREIGN PATENT DOCUMENTS

| | | |
|---|---|---|
| JP | 2019028765 A | 8/2018 |
| JP | 2019-28765 A | 2/2019 |
| JP | 2019109697 A | 7/2019 |
| WO | 2007/027702 A2 | 8/2007 |
| WO | 2018/219886 A1 | 12/2018 |

OTHER PUBLICATIONS

Office Action mailed on Aug. 25 for JP Application No. 2020-083799.

Office Action issued in corresponding European Application No. 20892885.3 mailed May 28, 2024 (5 pages).

* cited by examiner

POWER CONVERSION DEVICE, CONTROL DEVICE, DATA ACCUMULATING DEVICE, AND DATA ACCUMULATING METHOD

CROSS-REFERENCE TO RELATED APPLICATIONS

This application is the U.S. national stage application filed pursuant to 35 U.S.C. 365(c) and 120 as a continuation of International Patent Application No. PCT/JP2020/042679, filed Nov. 16, 2020, which application claims priority to Japan Patent Application No. 2020-083799, filed May 12, 2020, which application claims priority to U.S. Patent Application No. 62/940,261, filed Nov. 26, 2019, which applications are incorporated herein by reference in their entireties.

TECHNICAL FIELD

The present disclosure relates to a power conversion device, a control device, a data accumulating device, and a data accumulating method.

BACKGROUND ART

An information acquisition device for a machine tool described in Patent Document 1 is an information acquisition device for acquiring information on a machine tool and includes a time series information recording circuit configured to acquire machine information in time series at a predetermined timing; an event information recording circuit configured to record at least one of: a change content and time when any one of step information related to a process step, tool information, control panel information related to a control panel of the machine tool, workpiece information, and operator information is changed, and an instruction and time when an instruction related to a start or an end of machine control execution is issued; and an output circuit configured to output time series data of the machine information recorded in the time series information recording circuit together with event data recorded in the event information recording circuit.

CITATION LIST

Patent Document 1: JP 2017-033346 A

SUMMARY OF INVENTION

Technical Problem

The present disclosure provides a power conversion device, a control device, a data accumulating device, and a data accumulating method that effectively achieve both data storage resource saving and detailed data analysis.

Solution to Problem

A power conversion device according to an aspect of the present disclosure is provided with: a power conversion circuit configured to perform power conversion between a primary power and a secondary power; a buffer data accumulation circuit configured to, in a predetermined buffer cycle, repeatedly acquire data sets relating to a state of the power conversion circuit and stores the data sets in a ring buffer; a state monitoring circuit configured to generate a trigger signal in a case where a state of a predetermined monitoring target satisfies a predetermined condition; and a data replication circuit configured to, in a case where the trigger signal is generated, store, in a data storage circuit, a plurality of the data sets accumulated in the ring buffer in a target storage period including a time before a generation time of the trigger signal.

A control device according to another aspect of the present disclosure is provided with: a controller configured to control a control target; a buffer data accumulation circuit configured to, in a predetermined buffer cycle, repeatedly acquire data sets relating to a state of the control target and stores the data sets in a ring buffer; a state monitoring circuit configured to generate a trigger signal in a case where a state of a predetermined monitoring target satisfies a predetermined condition; and a data replication circuit configured to, in a case where the trigger signal is generated, store, in a data storage circuit, a plurality of the data sets accumulated in the ring buffer in a target storage period including a time before a generation time of the trigger signal.

A data accumulating device according to another aspect of the present disclosure is provided with: a buffer data accumulation circuit configured to, in a predetermined buffer cycle, repeatedly acquire data sets relating to a state of a power conversion circuit that performs power conversion between a primary power and a secondary power and store the data sets in a ring buffer; a state monitoring circuit configured to generate a trigger signal in a case where a state of a predetermined monitoring target satisfies a predetermined condition; and a data replication circuit configured to, in a case where the trigger signal is generated, store, in a data storage circuit, a plurality of the data sets accumulated in the ring buffer in a target storage period including a time before a generation time of the trigger signal.

A data accumulating method according to another aspect of the present disclosure includes: in a predetermined buffer cycle, repeatedly acquiring data sets relating to a state of a power conversion circuit that performs power conversion between a primary power and a secondary power and storing the data sets in a ring buffer; generating a trigger signal in a case where a state of a predetermined monitoring target satisfies a predetermined condition; and in a case where the trigger signal is generated, storing, in a data storage circuit, a plurality of the data sets accumulated in the ring buffer in a target storage period including a time before a generation time of the trigger signal.

Advantageous Effects of Invention

According to the present disclosure, a power conversion device, a data accumulating device, and a data accumulating method that effectively achieve both data storage resource saving and detailed data analysis can be provided.

DESCRIPTION OF EMBODIMENTS

An embodiment will be described in detail below with reference to the drawings. In the description, elements which are the same or have the same function are given the same reference numbers, and redundant descriptions thereof are omitted.

Power Conversion Device

Figure 1:
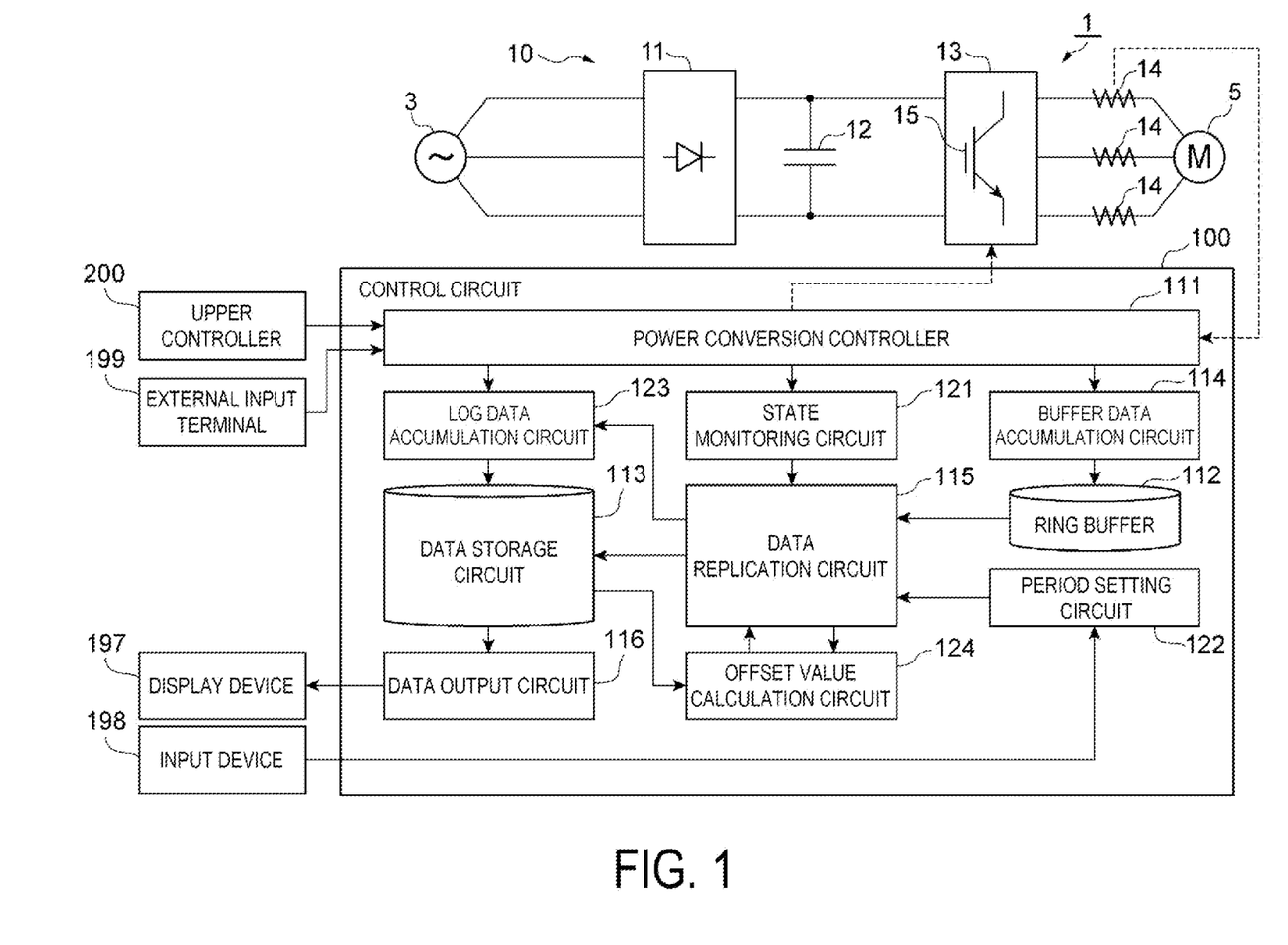
FIG. 1 is a schematic diagram illustrating an example of a configuration of a power conversion device.

A power conversion device 1 illustrated in FIG. 1 is a device that supplies driving power to a device. The device includes a motor 5 and a driven object driven by the motor 5, and the power conversion device 1 supplies driving power to the motor 5. The device is not limited provided that the device includes the motor 5 and the driven object driven by the motor 5. Specific examples of the device include a fan, a pump, a compressor, a conveyor, and a chiller.

The motor 5 may be a rotary electric motor or a linear electric motor. The motor 5 may be an induction electric motor or a synchronous electric motor. The motor 5 may be an alternating current (AC) electric motor or a direct current (DC) electric motor. The motor 5 may be of a fixed coil type provided with a coil in the stator, or may be of a movable coil type provided with a coil in a movable element.

The power conversion device 1 converts power of a power source 3 into driving power and supplies the driving power to the motor 5. The power of the power source 3 may be AC power or DC power. Specific examples of the power source include a three-phase power system and a three-phase alternating current uninterruptible power source. The driving power in a case where the motor 5 is an alternating current electric motor is AC power, and the driving power in a case where the motor 5 is a direct current electric motor is DC power. As an example, the power of the power source 3 and the driving power are both three-phase AC power.

For example, the power conversion device 1 includes a power conversion circuit 10 and a control circuit 100. The power conversion circuit 10 performs power conversion between the power of the power source 3 (primary power) and the driving power (secondary power). The power conversion circuit 10 is a voltage-type inverter, for example, and applies a driving voltage in accordance with a voltage command to the motor 5.

For example, the power conversion circuit 10 includes a converter circuit 11 (rectifier circuit), a smoothing capacitor 12, an inverter circuit 13, and a current sensor 14. The converter circuit 11 is, for example, a diode bridge circuit or a pulse width modulation (PWM) converter circuit and performs power conversion between the power of the power source 3 (primary power) and DC power (secondary power). The smoothing capacitor 12 smooths the DC power described above. The inverter circuit 13 performs power conversion between the DC power (primary power) described above and the driving power (secondary power) described above.

For example, the inverter circuit 13 includes a plurality of switching elements 15, and performs the power conversion described above by switching a plurality of switching elements 15 on and off. Each of the switching elements 15 is, for example, a power metal-oxide-semiconductor field-effect transistor (MOSFET) or an insulated gate bipolar transistor (IGBT), and is switched on and off in accordance with a gate drive signal.

The current sensor 14 detects a current flowing between the inverter circuit 13 and the motor 5. For example, the current sensor 14 may be configured to detect the currents of all phases of a three-phase alternating current (U phase, V phase, and W phase), or may be configured to detect the currents of any two phases of the three-phase alternating current. The sum of the currents of the U phase, V phase, and W phase is zero unless a zero phase current is generated, and thus information of the currents of all phases can be acquired even in a case in which the currents of two phases are detected.

The configuration of the power conversion circuit 10 described above is merely an example and can be modified as appropriate as long as driving power can be supplied to the motor 5. For example, the power conversion circuit 10 may be a current-type inverter. The current-type inverter outputs a drive current to the motor 5 in accordance with a current command. The power conversion circuit 10 may be a matrix converter circuit that performs bidirectional power conversion between the source power and the driving power without direct current conversion. In a case where the power of the power supply is DC power, the power conversion circuit 10 need not include the converter circuit 11. The power conversion circuit 10 may be a Thyristor-Leonard circuit.

The control circuit 100 controls the power conversion circuit 10 such that driving power is supplied to the motor 5. For example, the control circuit 100 controls the power conversion circuit 10 such that a driving voltage is applied to the motor 5 in accordance with a voltage command. The voltage command includes, for example, a magnitude and a phase of a voltage command vector.

The control circuit 100 is further configured to, in a predetermined buffer cycle, repeatedly acquire and accumulate, in a ring buffer, data sets relating to the state of the power conversion circuit 10, to generate a trigger signal in a case where the state of a predetermined monitoring target satisfies a predetermined condition, and, in a case where a trigger signal is generated, to store the plurality of data sets stored in the ring buffer in a target storage period including a time before a generation time of the trigger signal in a data storage circuit.

For example, the control circuit 100 has a functional configuration (hereinafter, referred to as "functional blocks") including a power conversion controller 111, a ring buffer 112, a data storage circuit 113, a state monitoring circuit 121, a buffer data accumulation circuit 114, a data replication circuit 115, and a data output circuit 116.

The power conversion controller 111 controls the power conversion circuit 10 such that a driving voltage is applied to the motor 5 in accordance with a voltage command. For example, the power conversion controller 111 generates a voltage command in accordance with a control command acquired from an upper controller 200, an operation input to an input device 198 described below, or a signal input (for example, an analog voltage signal) to an external input terminal 199 and, in a predetermined control cycle, repeatedly switches the switching elements 15 on and off such that a driving voltage is applied to the motor 5 in accordance with the voltage command.

For example, the power conversion controller 111 acquires a speed command (frequency command) from the upper controller 200, calculates a current command such that the deviation between the speed command and the operating speed of the motor 5 is reduced, and calculates a voltage command for outputting the drive current to the motor 5 in accordance with the current command. The operating speed of the motor 5 may be a value detected by a sensor, or may be an estimated speed value.

The estimated speed value is calculated on the basis of, for example, a driving voltage applied to the motor 5 by the power conversion circuit 10 and a drive current output by the power conversion circuit 10 to the motor 5. The drive current used for calculating the estimated speed value is, for example, a value detected by the current sensor 14. The driving voltage used for calculating the estimated speed value may be a voltage command in the previous control cycle, or may be a value detected by a voltage sensor.

The power conversion controller 111 may acquire a drive power command (for example, a torque command) from the upper controller 200, calculate a current command such that the drive power command and the drive power (drive power transmitted from the motor 5 to a driven object 4 (for example, torque)) of the motor 5 are the same, and calculate a voltage command for outputting the drive current to the motor 5 in accordance with the current command. The drive power may be calculated from a value detected by a current sensor, or may be estimated from the estimated speed value. The estimated speed value is calculated on the basis of, for example, a driving voltage applied to the motor 5 by the power conversion circuit 10 and a drive current output by the power conversion circuit 10 to the motor 5. The power conversion controller 111 may be configured to diagnose whether there is an abnormality in the power conversion circuit 10, and generate an alarm signal in a case where an abnormality in the power conversion circuit 10 is detected. The upper controller 200 is, for example, a programmable logic controller.

The ring buffer 112 temporarily stores a predetermined number (hereinafter, referred to as a "bufferable number") of data sets in time series. The bufferable number is determined based on the capacity of the ring buffer 112 and the number of data sets accumulated. After the number of data sets stored reaches the bufferable number, the ring buffer 112 deletes the oldest data set and stores a new data set. For example, the ring buffer 112 is a buffer including a plurality of storage areas logically connected in a ring shape. Each storage area stores one data set. After data sets are stored in all of the storage areas of the ring buffer 112, the oldest data set is overwritten with the latest data set. The data storage circuit 113 is a storage having a larger storage capacity than the ring buffer 112. The buffer data accumulation circuit 114, in a predetermined buffer cycle, repeatedly acquires one data set relating to the state of the power conversion circuit 10 and stores the data set in the ring buffer 112.

A data set includes at least one data item relating to the state of the power conversion circuit 10. Specific examples of a data item include the speed command, the operating speed of the motor 5, the drive power command, the drive power of the motor 5, the current command, and the current detection value, as well as a signal (for example, an analog voltage signal) input to the external input terminal 199. The buffer cycle is set as appropriate so that data of a sufficient particle size is obtained for data analysis when an abnormality occurs. For example, the buffer cycle is from 0.25 to 10 ms.

The state monitoring circuit 121 generates a trigger signal in a case where the state of a predetermined monitoring target satisfies a predetermined condition. For example, the state monitoring circuit 121 generates a trigger signal in a case where the state of the power conversion circuit 10 satisfies a predetermined condition. Specific examples of the condition include the drive power exceeding a predetermined threshold, the drive current exceeding a predetermined threshold, the amplitude of the drive power exceeding a predetermined threshold, the amplitude of the drive current exceeding a predetermined threshold, and a deviation (hereinafter, referred to as "speed deviation") between the speed command and the operating speed of the motor 5 exceeding a predetermined threshold. A time when to determine whether the speed deviation exceeds the predetermined threshold may further be determined. For example, whether the speed deviation exceeds the predetermined threshold may be determined at a time when a predetermined amount of time has passed after the motor 5 is activated. The trigger signal may be a digital signal or an analog signal.

Note that the monitoring target is not limited to the power conversion circuit 10. Other specific examples of the monitoring target include a command from the upper controller 200, an operation input to the input device 198 described below, and a signal input to the external input terminal 199. For example, the state monitoring circuit 121 may generate a trigger signal in a case where the command from the upper controller 200 includes a data storage command. For example, the state monitoring circuit 121 may generate a trigger signal in a case where the operation input to the input device 198 includes a data storage command. For example, the state monitoring circuit 121 may generate a trigger signal in a case where the signal input to the external input terminal 199 includes a data storage command.

The state monitoring circuit 121 may have various types of conditions and may generate a trigger signal in a case where the state of the power conversion circuit 10 satisfies any one of the various types of conditions. In this case, the state monitoring circuit 121 may generate various trigger signals corresponding to the various types of conditions to indicate which of the various types of conditions has been satisfied.

In a case where the trigger signal is generated, the data replication circuit 115 stores, in the data storage circuit 113, the plurality of data sets accumulated in the ring buffer 112 during the target storage period that includes the time before a generation time of the trigger signal.

The data replication circuit 115 may store, in the data storage circuit 113, the plurality of data sets accumulated in the ring buffer 112 during the target storage period that further includes the time after the generation time of the trigger signal. For example, in a state where data sets are stored in all of the storage areas of the ring buffer 112, the data replication circuit 115 continues to accumulate data in the ring buffer 112 via the buffer data accumulation circuit 114 until a predetermined amount of time (hereinafter, referred to as "post-trigger period") has passed, and then temporarily suspends accumulating data in the ring buffer 112 via the buffer data accumulation circuit 114 and stores the contents of the ring buffer 112 in the data storage circuit 113. The duration of the target storage period is equal to a bufferable period of the ring buffer 112. The bufferable period is a period obtained by multiplying the bufferable number described above and the buffer cycle described above. The post-trigger period is shorter than the bufferable period. Thus, the plurality of data sets accumulated in the ring buffer 112 when the post-trigger period has elapsed includes the data sets accumulated in the period before the generation time of the trigger signal (hereinafter, referred to as "pre-trigger period").

The data output circuit 116 outputs the plurality of data sets stored by the data storage circuit 113 to the upper controller 200 or a display device 197 (described below) or the like. The data output circuit 116 may repeatedly output the plurality of data sets in a predetermined output cycle, or may output the plurality of data sets in response to an output request. The data output circuit 116 acquires an output request from the upper controller 200 or the input device 198 (described below), for example.

The control circuit 100 may further include a period setting circuit 122. The period setting circuit 122 sets the duration of the period (the pre-trigger period described above) of the target storage period before the generation time of the trigger signal and the buffer cycle on the basis of a user input. As described above, the duration of the target storage period is equal to the duration of the bufferable period, and the bufferable period is determined according to the buffer cycle. Thus, the post-trigger period is determined by determining the pre-trigger period and the buffer cycle. Similarly, the pre-trigger period is determined by determining the post-trigger period and the buffer cycle, and the buffer cycle is determined by determining the pre-trigger period and the post-trigger period. Accordingly, a user input for setting the pre-trigger period and the buffer cycle does not need to be input by directly specifying the pre-trigger period and the buffer cycle and may be an input for specifying the post-trigger period and the buffer cycle or may be an input for specifying the pre-trigger period and the post-trigger period. Furthermore, the user input for setting the pre-trigger period and the buffer cycle may be an input for specifying the percentage (%) of the pre-trigger period included in the bufferable period. According to this input, the percentage of the post-trigger period included in the bufferable period is determined, resulting in the buffer cycle being determined.

The period setting circuit 122 may acquire the user input specifying the pre-trigger period and may automatically set the post-trigger period on the basis of the bufferable period and the pre-trigger period. The period setting circuit 122 may acquire the user input specifying the post-trigger period and may automatically set the pre-trigger period on the basis of the bufferable period and the post-trigger period. The period setting circuit 122 may automatically set the pre-trigger period and the post-trigger period on the basis of the type of the trigger signal.

The control circuit 100 may further include a log data accumulation circuit 123 and an offset value calculation circuit 124. The log data accumulation circuit 123, in a log cycle longer than the buffer cycle, repeatedly acquires one data set relating to the state of the power conversion circuit 10 and stores the data set in the data storage circuit 113.

A data set (hereinafter, referred to as "long cycle data set") stored in the data storage circuit 113 by the log data accumulation circuit 123 includes at least one data item relating to the state of the power conversion circuit 10. The configuration of the long cycle data set is at least partially shared with the configuration of a data set (hereinafter, referred to as "short cycle data set") stored in the ring buffer 112 by the buffer data accumulation circuit 114. For example, the long cycle data set and the short cycle data set share the same number and type of data items. The configuration of the long cycle data set may be in part different from the configuration of the short cycle data set. For example, the short cycle data may have a larger number of data items than the long cycle data.

For example, in a case where a trigger signal is generated, the log data accumulation circuit 123 suspends storing the long cycle data sets in the data storage circuit 113, and, after the data replication circuit 115 stores a plurality of short cycle data sets in the data storage circuit 113, the log data accumulation circuit 123 resumes storing the long cycle data sets in the data storage circuit 113.

The data storage circuit 113 stores a plurality of long cycle data sets and a plurality of short cycle data sets in time series. For example, the data storage circuit 113 stores a plurality of long cycle data sets and a plurality of short cycle data sets in order of the storage time to the data storage circuit 113.

The log cycle is appropriately set so that data of a sufficient granularity is obtained for normal operation tendency determination. For example, the log cycle is from 0.1 to 10 s. The log data accumulation circuit 123 may limit the period (hereinafter, referred to as "storable period") in which the long cycle data sets can be stored in the data storage circuit 113 during a series of periods without suspension due to trigger signal generation. For example, in a case where the series of periods exceeds the storable period, the log data accumulation circuit 123 may overwrite the oldest long cycle data set in the series of periods with the latest long cycle data set.

Note that, as an example of limiting the storable period, the log data accumulation circuit 123 may limit the number (hereinafter, referred to as "storable number") of long cycle data sets that can be stored in the series of periods. The storable period corresponds to a period obtained by multiplying the storable number by the log cycle, and thus the storable period is also limited by limiting the storable number. The storable period is longer than the bufferable period. For example, the storable period may be from 2 to 100 times, from 10 to 80 times, from 20 to 70 times, or from 30 to 60 times the bufferable period.

The offset value calculation circuit 124 calculates an offset value representing the relationship between the start time of the target storage period and the storage time of the long cycle data sets by the log data accumulation circuit 123. The offset value calculation circuit 124 calculates an offset value on the basis of the generation time of the trigger signal, the time at which the log data accumulation circuit 123 stores the long cycle data sets in the data storage circuit 113 immediately before the generation time, and the duration of the pre-trigger period.

Figure 2:
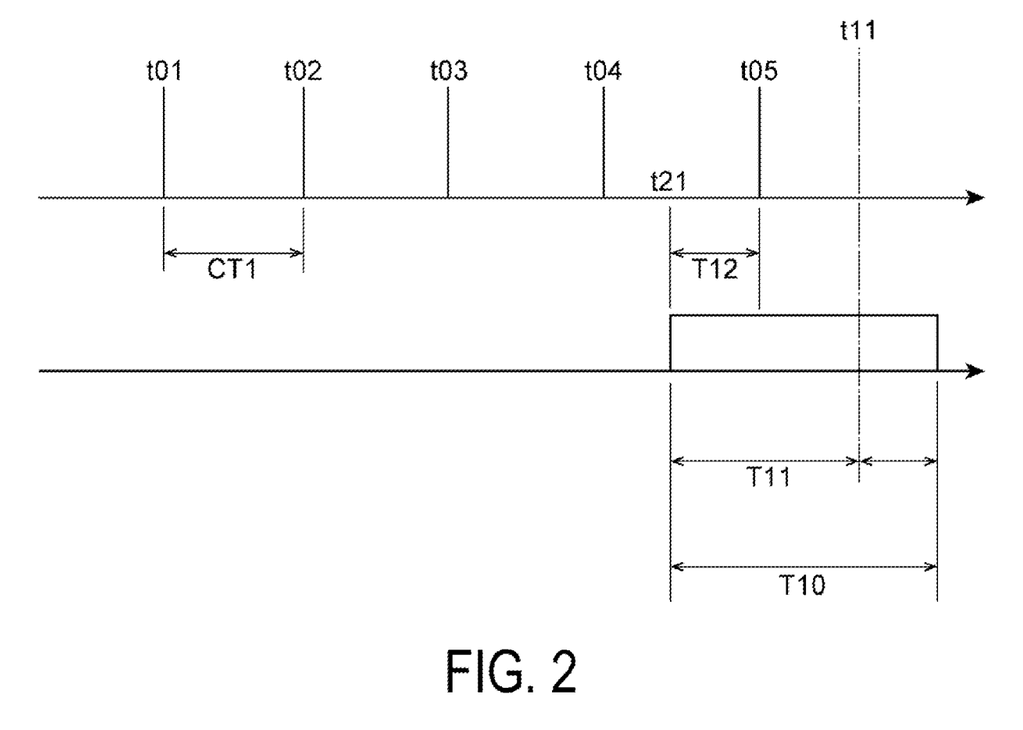
FIG. 2 is a timing chart illustrating an example of the relationship between the storage time of long cycle data sets, the start time of a target storage period, a trigger generation time, and an offset value.

FIG. 2 is a timing chart illustrating the relationship between the storage time of the long cycle data sets, the start time of the target storage period, the trigger generation time, and the offset value, with the right direction in the diagram representing the passage of time. Times t01, t02, t03, t04, and t05 are the storage times of the long cycle data, and the intervals therebetween correspond to a log cycle CT1.

In FIG. 2, a trigger signal is generated at a time t11 immediately after the time t05. Accordingly, the time t05 is the time when the log data accumulation circuit 123 stores the long cycle data sets in the data storage circuit 113 immediately prior to the generation time t11 of the trigger signal. The offset value calculation circuit 124 calculates a start time t21 of a target storage period T10 on the basis of the duration of a pre-trigger period T11 and a generation time t11 of the trigger signal and calculates, as an offset value T12, the time difference (t05-t21) between the time t21 and the time t05.

The data replication circuit 115 may associate together and store in the data storage circuit 113 the plurality of long cycle data sets accumulated in the data storage circuit 113 by the log data accumulation circuit 123 and the plurality of short cycle data sets. For example, the data replication circuit 115 associates together and stores the plurality of long cycle data sets, the offset value, and the plurality of short cycle data sets in the data storage circuit 113.

For example, the data replication circuit 115 stores in the data storage circuit 113 the plurality of short cycle data sets in association with the offset value and the storage time of the long cycle data sets corresponding to a calculation criterion for the offset value. This allows the plurality of long cycle data sets and the plurality of short cycle data sets to be arranged in order in the same time series. The data replication circuit 115 may further associate together a setting parameter, such as the pre-trigger period or the post-trigger period, and store the plurality of short cycle data sets in the data storage circuit 113.

The data output circuit 116 may output a plurality of data sets including both the plurality of long cycle data sets and the plurality of short cycle data sets to the upper controller 200, the display device 197 (described below), or the like. This allows long term tendency data indicated by the plurality of long cycle data sets and short term detailed data indicated by the plurality of short cycle data sets to be displayed together.

Figure 3:
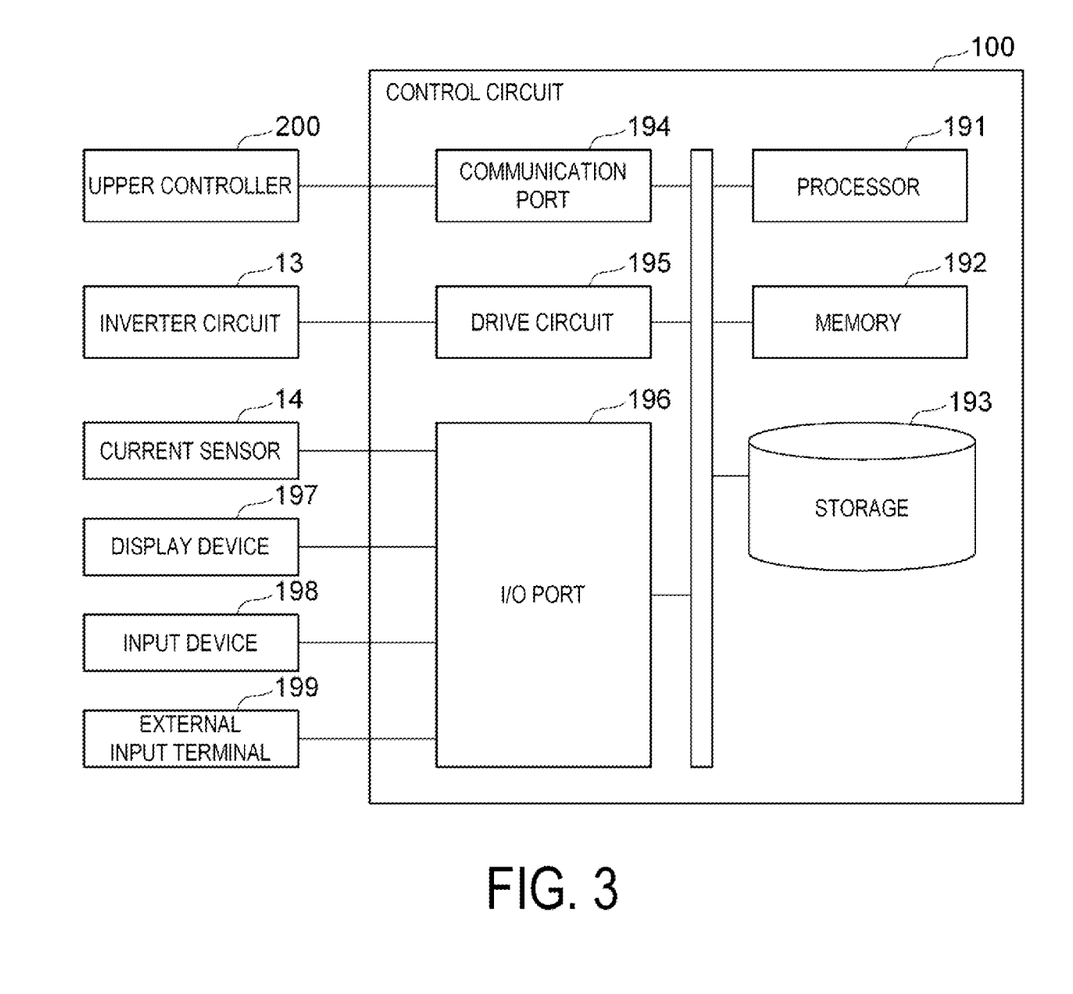
FIG. 3 is a block diagram illustrating an example of a hardware configuration of a control circuit.

FIG. 3 is a block diagram illustrating an example of a hardware configuration of the control circuit 100. As illustrated in FIG. 3, the control circuit 100 includes one or a plurality of processors 191, a memory 192, a storage 193, a communication port 194, a drive circuit 195, and an I/O port 196. The storage 193 includes a computer-readable storage medium such as a non-volatile semiconductor memory, for example. The storage 193 stores a program for causing the control circuit 100 to execute controlling the power conversion circuit 10 to supply driving power to the motor 5, repeatedly acquire data sets relating to the state of the power conversion circuit 10 and accumulate the data sets in the ring buffer 112 in a predetermined buffer cycle, and, in a case where a trigger signal is generated, store the plurality of data sets accumulated in the ring buffer 112 in the target storage period including at least the pre-trigger period up until the generation time of the trigger signal in the data storage circuit 113. The storage 193 is, for example, a hard disk or non-volatile memory.

The memory 192 temporarily stores programs loaded from the storage medium of the storage 193 and calculation results from the processor 191. The memory 192 is, for example, random-access memory. The processor 191 implements each functional block of the control circuit 100 by executing the program described above in cooperation with the memory 192. The communication port 194 performs information communication with the upper controller 200 in accordance with commands from the processor 191. The drive circuit 195 outputs, to the inverter circuit 13, a drive signal for switching the switching elements 15 on and off in accordance with commands from the processor 191. The I/O port 196 inputs and outputs electric signals to and from the current sensor 14, the display device 197, the input device 198, the external input terminal 199, and the like in accordance with commands from the processor 191.

The display device 197 includes, for example, a liquid crystal panel or an organic EL panel and displays an interface image in accordance with a command from the processor 191. The input device 198 includes an input key, for example, and acquires input (key input) via the input key. The display device 197 and the input device 198 may be configured as bodies separate from the body of the power conversion device 1 and may be capable of communicating with the body via a wired or wireless connection. In this case, the display device 197 and the input device 198 may be integrally formed as a keypad, and with the keypad, the display device 197 and the input device 198 may be integrally formed as a touch panel. The external input terminal 199 is provided outside of the power conversion device 1 and acquires an electric signal (for example, an analog voltage signal) from the outside.

Note that the ring buffer 112 and the data storage circuit 113 described above are provided in a medium fixed inside the power conversion device 1. For example, the ring buffer 112 may be provided in the memory 192, or may be provided in the storage 193. The data storage circuit 113 may be provided in a portable medium that is removable from a media drive fixed to the power conversion device 1. The data storage circuit 113 may be provided in a medium fixed to the keypad. Also, the data storage circuit 113 may be provided in a portable medium that is removable from a media drive fixed to the keypad. Specific examples of the portable medium include an SD card and a USB memory.

The functions of the control circuit 100 are not limited to being implemented by a program. For example, the control circuit 100 may implement at least one function by a dedicated logic circuit or an application specific integrated circuit (ASIC) integrated therewith.

As described above, the power conversion device 1 is provided with, as an example of a control device, a controller (power conversion controller 111) that controls a control target (power conversion circuit 10 and motor 5); the buffer data accumulation circuit 114 that, in a predetermined buffer cycle, repeatedly acquires data sets relating to the state of the control target and stores the data sets in the ring buffer 112; the state monitoring circuit 121 that generates a trigger signal in a case where the state of a predetermined monitoring target satisfies a predetermined condition; and the data replication circuit 115 that, in a case where the trigger signal is generated, stores, in the data storage circuit 113, the plurality of data sets accumulated in the ring buffer 112 in the target storage period including the time before the generation time of the trigger signal. The power conversion controller 111 and the power conversion circuit 10 may be considered to constitute a controller for controlling the motor 5.

The data storage circuit 113 does not need to be provided inside the control device and may be provided outside of the control device. For example, the data storage circuit 113 may be provided in the upper controller 200, or may be provided in an external storage capable of communicating with the control device via a wired or wireless connection. Also, the data storage circuit 113 may be provided in a keypad for operating the control device. Storing a plurality of data sets in the data storage circuit 113 includes sending the data sets to the upper controller 200, the external storage, the keypad, or the like, so that the data sets are stored in the data storage circuit 113 by the upper controller 200, the external storage, the keypad, or the like. The data storage circuit 113 may be provided in a removable medium such as an SD card.

The configuration including the controller, the buffer data accumulation circuit, the state monitoring circuit, and the data replication circuit is also applicable to a control device (for example, a servo controller) other than the power conversion device. The controller in a servo controller includes at least a control calculation circuit that generates a command, and the control target in the servo controller includes at least a servomotor. The driver circuit that supplies driving power to the servo motor on the basis of a command can be considered to be included in a control target and can be considered to be included in a controller.

Power Conversion Procedure

Next, as an example of a data accumulating method, a power conversion process including a data accumulating process will be described. The process includes a power conversion control process, a buffer data accumulating process, a log data accumulating process, and a data output process. The buffer data accumulating process, the log data accumulating process, and the data output process are executed in parallel with the power conversion control process. Examples of the processes are described in detail below.

Power Conversion Control Process

Figure 4:
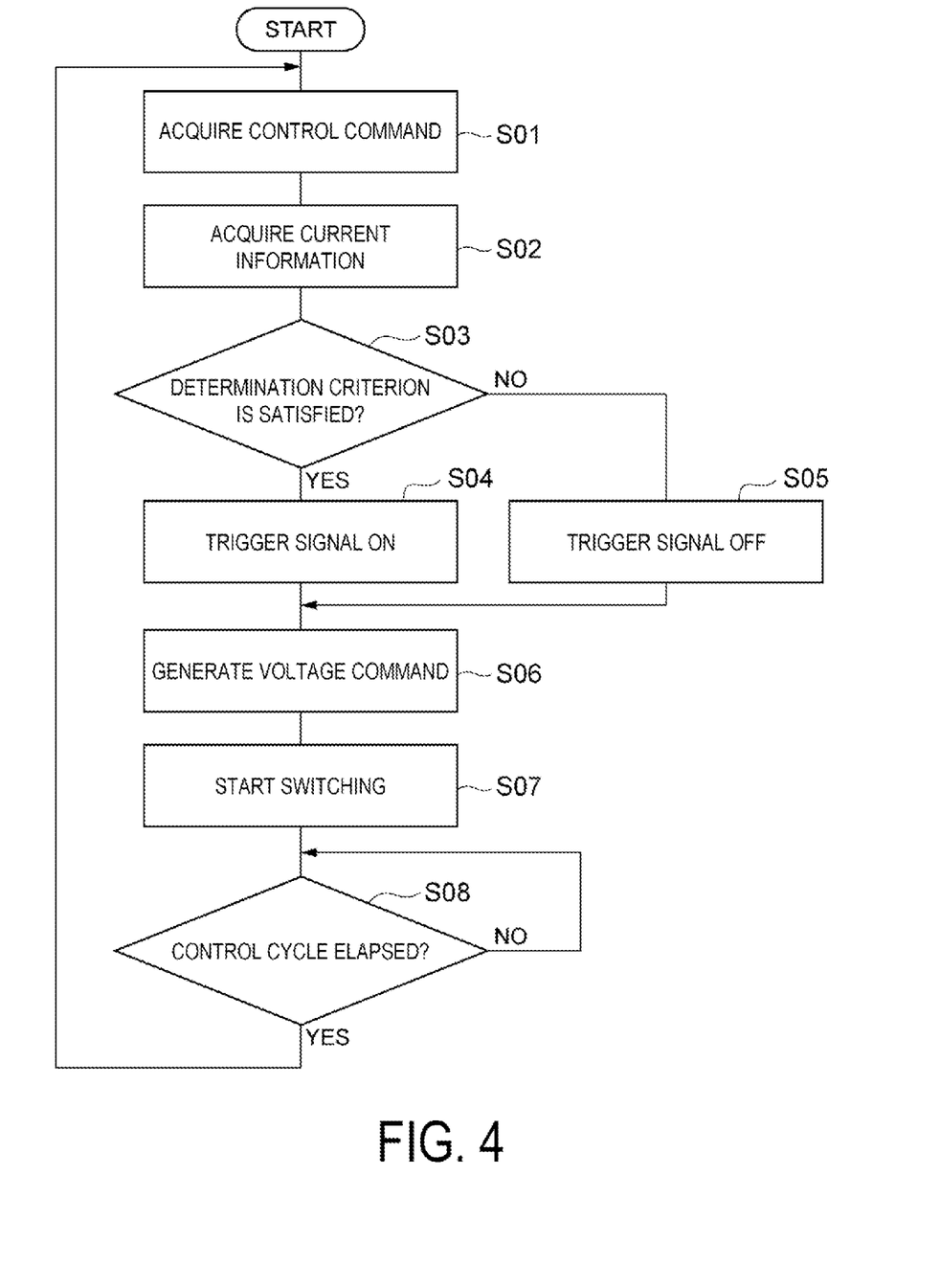
FIG. 4 is a flowchart illustrating an example of a power conversion control process.

This process includes generating a trigger signal in a case where the state of the power conversion circuit 10 satisfies a predetermined condition. As illustrated in FIG. 4, the control circuit 100 first executes steps S01, S02, and S03. In step S01, the power conversion controller 111 acquires control commands, such as the speed command and the torque command from the upper controller 200. In step S02, the power conversion controller 111 acquires a value detected by the current sensor 14 as current information. In step S03, the state monitoring circuit 121 checks for whether the state of the power conversion circuit 10 satisfies the condition described above.

In a case where, in step S03, it has been determined that the state of the power conversion circuit 10 satisfies the condition, the control circuit 100 executes step S04. In step S04, the state monitoring circuit 121 turns on (generates) the trigger signal. In a case where, in step S03, it has been determined that the state of the power conversion circuit 10 does not satisfy the condition, the control circuit 100 executes step S05. In step S05, the state monitoring circuit 121 turns off (does not generate) the trigger signal.

Next, the control circuit 100 executes steps S06, S07, and S08. In step S06, the power conversion controller 111 generates a voltage command on the basis of the control command and the current information described above. In step S07, the power conversion controller 111 starts switching the plurality of switching elements 15 on and off such that a driving voltage is applied to the motor 5 in accordance with the voltage command. In step S08, the power conversion controller 111 waits for the control cycle to elapse.

The control circuit 100 repeatedly executes the processes described above. The processes described above can be changed as appropriate. For example, steps S03, S04, and S05 may be executed after step S07.

Buffer Data Accumulating Process

Figure 5:
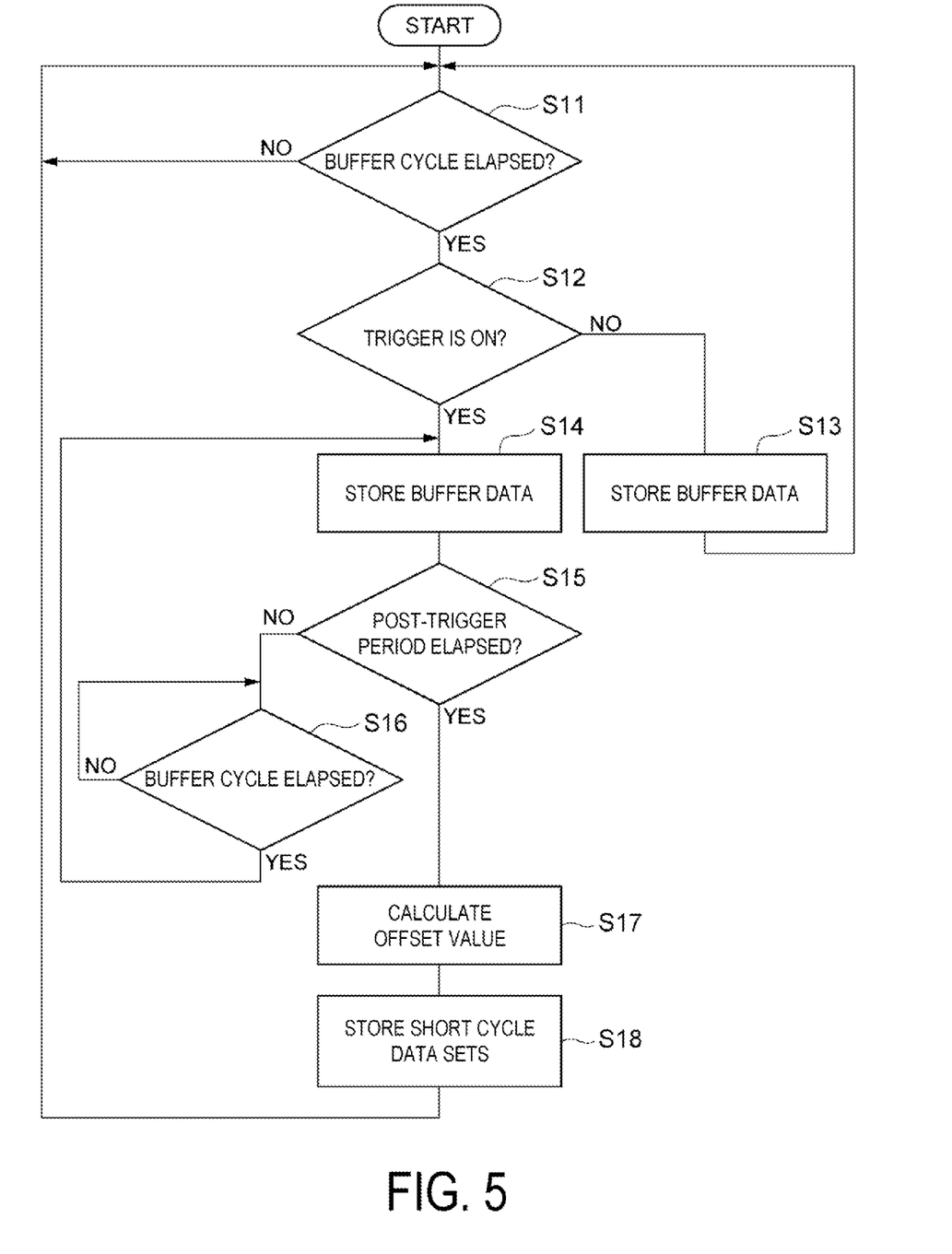
FIG. 5 is a flowchart illustrating an example of a buffer data accumulating process.

This process includes repeatedly acquiring short cycle data sets and accumulating the short cycle data sets in the ring buffer 112 in a predetermined buffer cycle, and, in a case where a trigger signal is generated, storing the plurality of short cycle data sets accumulated in the ring buffer 112 in the target storage period including at least the pre-trigger period up until the generation time of the trigger signal in the data storage circuit 113.

As illustrated in FIG. 5, the control circuit 100 first executes steps S11 and S12. In step S11, the buffer data accumulation circuit 114 waits for the buffer cycle to elapse. In step S12, the data replication circuit 115 checks for whether the trigger signal is on (has been generated).

In a case where it is determined that the trigger signal is not on in step S12, the control circuit 100 executes step S13. In step S13, the buffer data accumulation circuit 114 stores the short cycle data sets in the ring buffer 112. Subsequently, the control circuit 100 returns the processing to step S11. Until the trigger signal is generated, storing the short cycle data sets in the ring buffer 112 is repeated in the buffer cycle.

In a case where it is determined that the trigger signal is on in step S12, the control circuit 100 executes steps S14 and S15. In step S14, the buffer data accumulation circuit 114 stores the short cycle data sets in the ring buffer 112. In step S15, the data replication circuit 115 checks for whether the post-trigger period from the generation time of the trigger signal has elapsed.

In a case where it is determined that the post-trigger period has not elapsed in step S15, the control circuit 100 executes step S16. In step S16, the buffer data accumulation circuit 114 waits for the buffer cycle to elapse. Subsequently, the control circuit 100 returns the processing to step S14. Until the post-trigger period elapses, storing the short cycle data sets in the ring buffer 112 is repeated in the buffer cycle.

In a case where it is determined that the post-trigger period has elapsed in step S15, the control circuit 100 executes steps S17 and S18. In step S17, the offset value calculation circuit 124 calculates an offset value on the basis of the generation time of the trigger signal, the time at which the log data accumulation circuit 123 stores the long cycle data sets in the data storage circuit 113 immediately before the generation time, and the duration of the pre-trigger period. In step S18, the data replication circuit 115 stores in the data storage circuit 113 the short cycle data sets, the offset value, and the trigger setting parameter in association with the long cycle data sets. The control circuit 100 repeatedly executes the processes described above.

Log Data Accumulating Process

Figure 6:
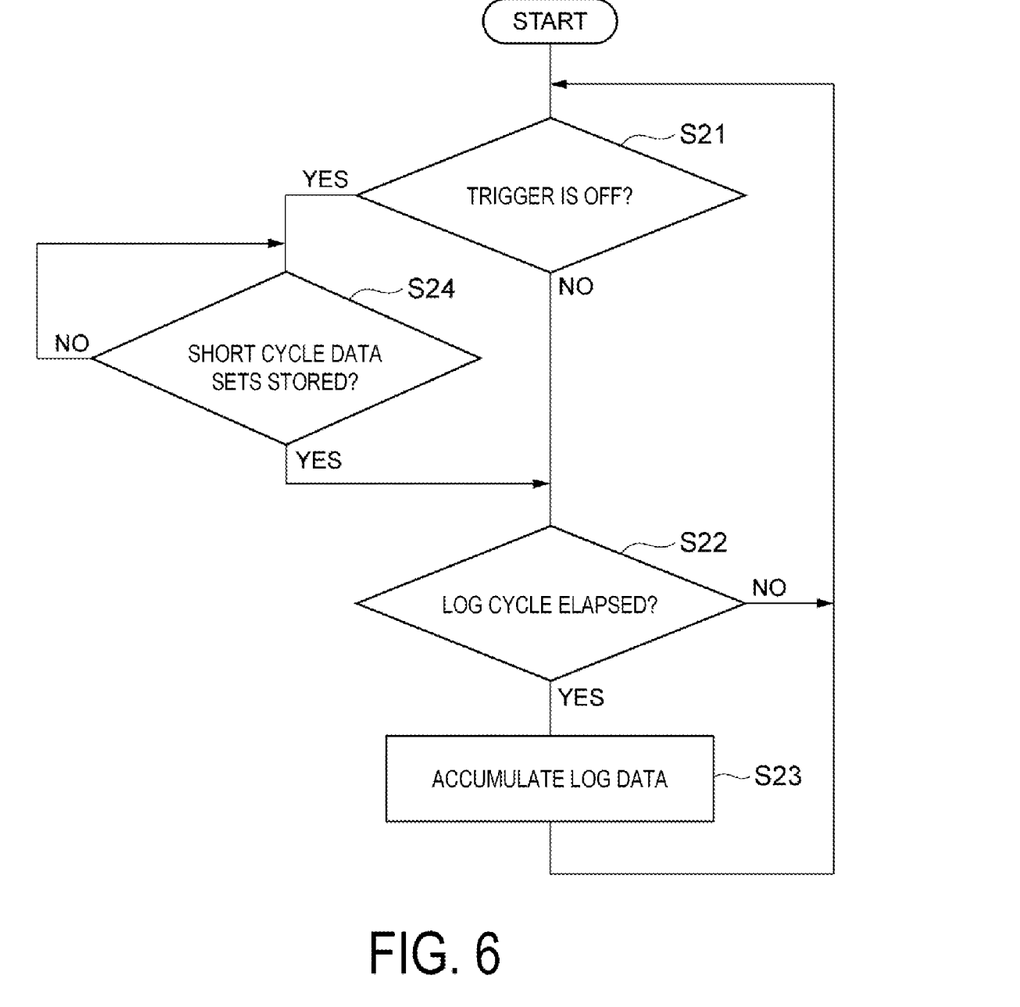
FIG. 6 is a flowchart illustrating an example of a log data accumulating process.

This process includes repeatedly, in a log cycle longer than the buffer cycle, acquiring one data set relating to the state of the power conversion circuit 10 and storing the data set in the data storage circuit 113. As illustrated in FIG. 6, the control circuit 100 first executes step S21. In step S21, the log data accumulation circuit 123 checks for whether the trigger signal is off.

In a case where it is determined that the trigger signal is off in step S21, the control circuit 100 executes step S22. In step S22, the log data accumulation circuit 123 checks for whether the log cycle has elapsed. In a case where it is determined that the log cycle has not elapsed in step S22, the control circuit 100 returns the processing to step S21. Thereafter, the control circuit 100 waits for either the trigger signal to turn on or for the log cycle to elapse.

In a case where it is determined that the log cycle has elapsed in step S22, the control circuit 100 returns to step S23. In step S23, the log data accumulation circuit 123 stores the long cycle data sets in the data storage circuit 113. Then, the control circuit 100 returns the processing to step S21. Thereafter, until the trigger signal turns on, the long cycle data sets are repeatedly stored in the data storage circuit 113 in the log cycle.

In a case where it is determined that the trigger signal is not off in step S21, the control circuit 100 executes step S24. In step S24, the log data accumulation circuit 123 waits for the data replication circuit 115 to store the plurality of short cycle data sets in the data storage circuit 113. In this manner, after the trigger signal has been generated, until the plurality of short cycle data sets are stored, the storage of long cycle data sets by the log data accumulation circuit 123 is suspended. Thereafter, the control circuit 100 executes step S22. As a result, the storage of long cycle data sets by the log data accumulation circuit 123 is resumed. The control circuit 100 repeatedly executes the processes described above.

Data Output Process

Figure 7:
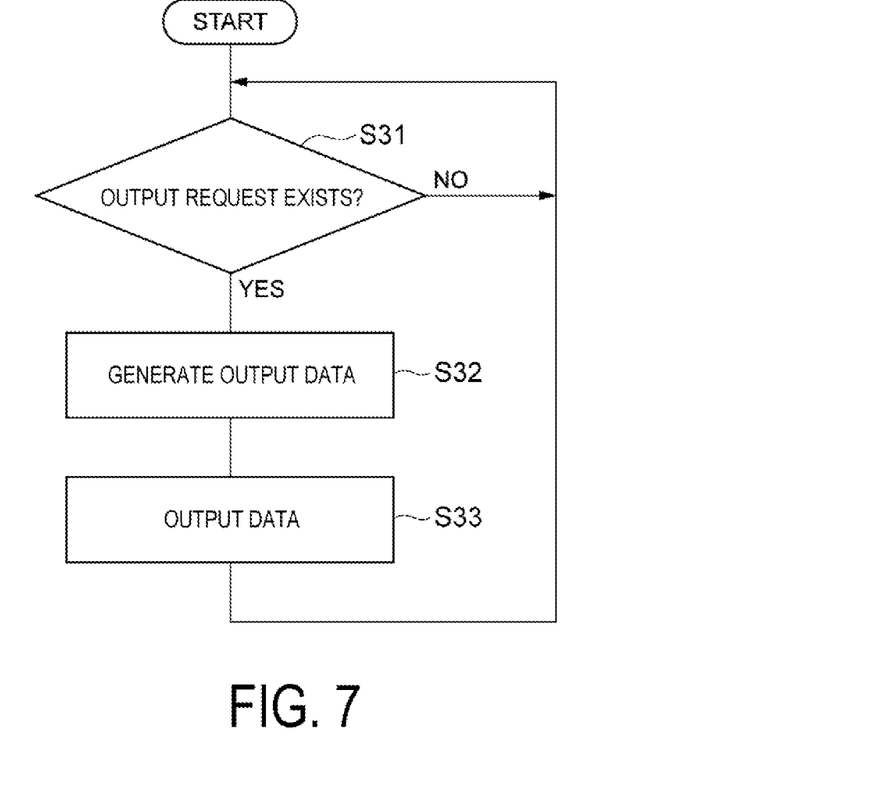
FIG. 7 is a flowchart illustrating an example of a data output process.

This process includes outputting a plurality of data sets stored by the data storage circuit 113 to the upper controller 200 or the display device 197 or the like. In the following example, the process is executed in response to an output request for a plurality of data sets. As illustrated in FIG. 7, the control circuit 100 executes steps S31, S32, S33. In step S31, the data output circuit 116 waits for an output request to be acquired from the upper controller 200 or the input device 198.

In step S32, the data output circuit 116 generates output data on the basis of the plurality of data sets stored by the data storage circuit 113. For example, the data output circuit 116 generates output data with the plurality of long cycle data sets and the plurality of short cycle data sets arranged in order in the same time series. In step S33, the data output circuit 116 outputs the output data to the upper controller 200, the display device 197, or the like. The control circuit 100 repeatedly executes the processes described above.

Effects of the Present Embodiment

As described above, the power conversion device 1 is provided with the power conversion circuit 10 that performs power conversion between the primary power and the secondary power; the buffer data accumulation circuit 114 that, in a predetermined buffer cycle, repeatedly acquires data sets relating to the state of the power conversion circuit 10 and stores the data sets in the ring buffer 112; the state monitoring circuit 121 that generates a trigger signal in a case where the state of the predetermined monitoring target satisfies a predetermined condition; and the data replication circuit 115 that, in a case where a trigger signal is generated, stores, in the data storage circuit 113, a plurality of the data sets accumulated in the ring buffer 112 in the target storage period including the time before the generation time of the trigger signal.

By limiting storage of the plurality of data sets (the short cycle data sets described above) accumulated in the buffer cycle by the data storage circuit 113 to only when a trigger signal is generated, the buffer cycle can be reduced and the size of the data stored in the data storage circuit 113 can be reduced. Furthermore, by storing, in the data storage circuit 113, the plurality of short cycle data sets accumulated in the target storage period including the time before the generation time of the trigger signal, changes in the data until the trigger signal is generated can be analyzed in detail. Accordingly, the power conversion device 1 can effectively achieve both data accumulation resource saving and detailed data analysis.

The state monitoring circuit 121 may be configured to generate a trigger signal in a case where the state of the power conversion circuit 10 satisfies a predetermined condition. In this case, the plurality of short cycle data sets in a period where it is highly necessary to analyze the state of the power conversion circuit 10 can be stored in the data storage circuit 113.

The data replication circuit 115 may store, in the data storage circuit 113, the plurality of data sets accumulated in the ring buffer 112 during the target storage period, the target storage period further including the time after the generation time of the trigger signal. In this case, changes in the data after the trigger signal is generated can also be analyzed in detail.

The power conversion device 1 may be further provided with the period setting circuit 122 that sets the duration of the period of the target storage period before the generation time of the trigger signal and the buffer cycle on the basis of a user input. In this case, data accumulation corresponding to the frequency of change in the data to be analyzed can be performed.

The power conversion device 1 may further be provided with the log data accumulation circuit 123 that, in a log cycle shorter than the buffer cycle, repeatedly stores at least one long cycle data set relating to the state of the power conversion circuit 10 in the data storage circuit 113. The data replication circuit 115 may associate together and store in the data storage circuit 113 a plurality of the long cycle data sets accumulated in the data storage circuit 113 by the log data accumulation circuit 123 and the plurality of data sets. In this case, data accumulation resources can be saved, and data sets can be accumulated over a longer period of time.

The power conversion device 1 may further be provided with the offset value calculation circuit 124 that calculates an offset value representing the relationship between the start time of the target storage period and the storage time of the long cycle data sets by the log data accumulation circuit 123. The data replication circuit 115 may store the plurality of long cycle data sets, the offset value, and the plurality of data sets in the data storage circuit 113. In this case, the relationship between the change over time in the plurality of long cycle data sets and the change over time in the plurality of short cycle data sets can be appropriately illustrated.

The offset value calculation circuit 124 may calculate the offset value on the basis of the generation time of the trigger signal, the time at which the log data accumulation circuit 123 stores the long cycle data sets in the data storage circuit 113 immediately before the generation time, and the duration of the target storage period before the generation time of the trigger signal. In this case, the offset value can be easily calculated.

In a case where a trigger signal is generated, the log data accumulation circuit 123 may suspend storing the long cycle data sets in the data storage circuit 113, and, after the data replication circuit 115 stores a plurality of data sets in the data storage circuit 113, the log data accumulation circuit 123 may resume storing the long cycle data sets in the data storage circuit 113. In this case, the data accumulation resources can be further saved.

Embodiments have been described above. However, the present disclosure is not limited to the embodiments described above, and various modifications are possible without departing from the scope of the present disclosure. In the example described above, the data accumulating device provided with the ring buffer 112, the data storage circuit 113, the state monitoring circuit 121, the buffer data accumulation circuit 114, the data replication circuit 115, the data output circuit 116, the period setting circuit 122, the log data accumulation circuit 123, and the offset value calculation circuit 124 is incorporated into the power conversion device 1. However, no such limitation is intended. The data accumulating device may be incorporated into a device other than the power conversion device 1. For example, the data accumulating device may be incorporated into the upper controller 200.

REFERENCE SIGNS LIST

1 Power conversion device
10 Power conversion circuit
112 Ring buffer
113 Data storage circuit
114 Buffer data accumulation circuit
115 Data replication circuit
121 State monitoring circuit
122 Period setting circuit
123 Log data accumulation circuit
124 Offset value calculation circuit

The invention claimed is:

1. A power conversion device, comprising:
   a power conversion circuit configured to perform power conversion between a primary power and a secondary power;
   a buffer data accumulation circuit configured to, in a predetermined buffer cycle, repeatedly acquire data sets relating to a state of the power conversion circuit and stores the data set in a ring buffer;
   a state monitoring circuit configured to generate a trigger signal in a case where a state of a predetermined monitoring target satisfies a predetermined condition; and
   a data replication circuit configured to, in a case where the trigger signal is generated, continue to accumulate data in the ring buffer via the buffer data accumulation circuit until a predetermined amount of time has passed, and store, in a data storage circuit, a plurality of the data sets accumulated in the ring buffer in a target storage period including a time before a generation time of the trigger signal and a time after the generation time of the trigger signal until the predetermined amount of time.

2. The power conversion device according to claim 1, wherein:
   the state monitoring circuit generates the trigger signal in a case where the state of the power conversion circuit satisfies a predetermined condition.

3. The power conversion device according to claim 1, further comprising: a period setting circuit configured to set a duration of a period of the target storage period before the generation time of the trigger signal and the buffer cycle on the basis of a user input.

4. The power conversion device according to claim 1, further comprising:
   a log data accumulation circuit configured to, in a log cycle longer than the buffer cycle, repeatedly store at least one long cycle data set relating to the state of the power conversion circuit in the data storage circuit.

5. The power conversion device according to claim 4, wherein
   the data replication circuit associates together and stores, in the data storage circuit, a plurality of the long cycle data sets accumulated in the data storage circuit by the log data accumulation circuit and the plurality of the data sets.

6. The power conversion device according to claim 5, further comprising:
   an offset value calculation circuit configured to calculate an offset value representing a relationship between a start time of the target storage period and a storage time of the long cycle data sets by the log data accumulation circuit, wherein
   the data replication circuit stores, in the data storage circuit, the plurality of long cycle data sets, the offset value, and the plurality of the data sets.

7. The power conversion device according to claim 6, wherein:
   the offset value calculation circuit calculates the offset value on the basis of the generation time of the trigger signal, a time at which the log data accumulation circuit stores the long cycle data sets in the data storage circuit immediately before the generation time, and a duration of a period of the target storage period before the generation time of the trigger signal.

8. The power conversion device according to claim 4, wherein:
   in a case where the trigger signal is generated, the log data accumulation circuit suspends storing the long cycle data sets in the data storage circuit, and, after the data replication circuit stores the plurality of the data sets in the data storage circuit, the log data accumulation circuit resumes storing the long cycle data sets in the data storage circuit.

9. The power conversion device according to claim 2, wherein:
   the data replication circuit stores, in the data storage circuit, the plurality of the data sets accumulated in the ring buffer in the target storage period, the target storage period further including a time after the generation time of the trigger signal.

10. The power conversion device according to claim 2, further comprising:
    a log data accumulation circuit configured to, in a log cycle longer than the buffer cycle, repeatedly store at least one long cycle data set relating to the state of the power conversion circuit in the data storage circuit.

11. The power conversion device according to claim 1, further comprising: a log data accumulation circuit configured to, in a log cycle longer than the buffer cycle, repeatedly store at least one long cycle data set relating to the state of the power conversion circuit in the data storage circuit.

12. The power conversion device according to claim 3, further comprising:
    a log data accumulation circuit configured to, in a log cycle longer than the buffer cycle, repeatedly store at least one long cycle data set relating to the state of the power conversion circuit in the data storage circuit.

13. The power conversion device according to claim 5, wherein:
    in a case where the trigger signal is generated, the log data accumulation circuit suspends storing the long cycle data sets in the data storage circuit, and, after the data replication circuit stores the plurality of the data sets in the data storage circuit, the log data accumulation circuit resumes storing the long cycle data sets in the data storage circuit.

14. The power conversion device according to claim 6, wherein:
    in a case where the trigger signal is generated, the log data accumulation circuit suspends storing the long cycle data sets in the data storage circuit, and, after the data replication circuit stores the plurality of the data sets in the data storage circuit, the log data accumulation circuit resumes storing the long cycle data sets in the data storage circuit.

15. The power conversion device according to claim 7, wherein:
    in a case where the trigger signal is generated, the log data accumulation circuit suspends storing the long cycle data sets in the data storage circuit, and, after the data replication circuit stores the plurality of the data sets in the data storage circuit, the log data accumulation circuit resumes storing the long cycle data sets in the data storage circuit.

16. A power conversion device, comprising:
    a power conversion circuit configured to perform power conversion between a primary power and a secondary power;
    a buffer data accumulation circuit configured to, in a predetermined buffer cycle, repeatedly acquire data sets relating to a state of the power conversion circuit and stores the data set in a ring buffer;

a state monitoring circuit configured to generate a trigger signal in a case where a state of a predetermined monitoring target satisfies a predetermined condition;

a data replication circuit configured to, in a case where the trigger signal is generated, store, in a data storage circuit, a plurality of the data sets accumulated in the ring buffer in a target storage period including a time before a generation time of the trigger signal;

a log data accumulation circuit configured to, in a log cycle longer than the buffer cycle, repeatedly store at least one long cycle data set relating to the state of the power conversion circuit in the data storage circuit, wherein the data replication circuit associates together and stores, in the data storage circuit, a plurality of the long cycle data sets accumulated in the data storage circuit by the log data accumulation circuit and the plurality of the data sets; and, an offset value calculation circuit configured to calculate an offset value representing a relationship between a start time of the target storage period and a storage time of the long cycle data sets by the log data accumulation circuit, wherein the data replication circuit stores, in the data storage circuit, the plurality of long cycle data sets, the offset value, and the plurality of the data sets.

17. A power conversion device, comprising:

a power conversion circuit configured to perform power conversion between a primary power and a secondary power;

a buffer data accumulation circuit configured to, in a predetermined buffer cycle, repeatedly acquire data sets relating to a state of the power conversion circuit and stores the data set in a ring buffer;

a state monitoring circuit configured to generate a trigger signal in a case where a state of a predetermined monitoring target satisfies a predetermined condition;

a data replication circuit configured to, in a case where the trigger signal is generated, store, in a data storage circuit, a plurality of the data sets accumulated in the ring buffer in a target storage period including a time before a generation time of the trigger signal; and, a log data accumulation circuit configured to, in a log cycle longer than the buffer cycle, repeatedly store at least one long cycle data set relating to the state of the power conversion circuit in the data storage circuit, wherein in a case where the trigger signal is generated, the log data accumulation circuit suspends storing the long cycle data sets in the data storage circuit, and, after the data replication circuit stores the plurality of the data sets in the data storage circuit, the log data accumulation circuit resumes storing the long cycle data sets in the data storage circuit.

* * * * *